US007820264B2

(12) United States Patent
Blank et al.

(10) Patent No.: US 7,820,264 B2

(45) Date of Patent: Oct. 26, 2010

(54) IDLE REGISTERED LABEL ROLL

(75) Inventors: Paul C. Blank, La Crosse, WI (US); Mark Keeton, Miamisburg, OH (US); Joseph Roth, Miamisburg, OH (US)

(73) Assignee: NCR Corporation, Duluth, GA (US)

( * ) Notice: Subject to any disclaimer, the term of this patent is extended or adjusted under 35 U.S.C. 154(b) by 1091 days.

(21) Appl. No.: 11/013,561

(22) Filed: Dec. 16, 2004

(65) Prior Publication Data

US 2006/0134365 A1 Jun. 22, 2006

(51) Int. Cl.
*B32B 9/00* (2006.01)
*B65D 65/28* (2006.01)
*B32B 7/12* (2006.01)

(52) U.S. Cl. .................... 428/40.1; 428/41.8; 428/42.1; 428/43; 428/343; 428/906

(58) Field of Classification Search ................ 428/40.1, 428/41.8, 192, 194, 343, 42.1, 43, 906, 195.1, 428/42.2, 42.3; 283/81
See application file for complete search history.

(56) References Cited

U.S. PATENT DOCUMENTS

| | | | | |
|---|---|---|---|---|
| 2,170,147 | A * | 8/1939 | Lane | 206/447 |
| 2,294,347 | A | 8/1942 | Bauer | |
| 2,349,710 | A | 5/1944 | Evans | |
| 2,684,316 | A | 7/1954 | Warshaw | |
| 2,721,810 | A | 10/1955 | Schram | |
| 2,867,317 | A | 1/1959 | Vogt | |
| 2,940,868 | A | 6/1960 | Patchell | |
| 3,503,782 | A | 3/1970 | Ayres | |
| 3,741,786 | A | 6/1973 | Torrey | |
| 3,900,642 | A * | 8/1975 | Michel | 428/40.1 |
| 4,884,826 | A * | 12/1989 | Slagsvol | 281/2 |
| 4,889,234 | A | 12/1989 | Sorensen et al. | |
| 5,061,535 | A | 10/1991 | Kreckel et al. | |
| 5,299,833 | A | 4/1994 | Madole, Jr. | |
| 5,578,352 | A * | 11/1996 | Smith | 428/40.1 |
| 5,691,437 | A | 11/1997 | Main | |
| 5,725,320 | A | 3/1998 | Austin et al. | |
| 5,782,494 | A | 7/1998 | Crandall et al. | |
| 5,926,197 | A | 7/1999 | Kessler | |
| 5,985,441 | A | 11/1999 | Szczepaniec et al. | |
| 6,040,026 | A | 3/2000 | Iwabuchi et al. | |
| 6,139,932 | A | 10/2000 | Kline | |
| 6,268,032 | B1 | 7/2001 | Mertens et al. | |
| 6,352,751 | B1 | 3/2002 | Miles et al. | |
| 6,383,631 | B1 | 5/2002 | Mehta | |
| 6,423,392 | B1 | 7/2002 | Koch et al. | |
| 6,509,077 | B1 | 1/2003 | Wantuch et al. | |
| 6,585,437 | B1 | 7/2003 | Wiklof et al. | |
| 6,830,795 | B1 | 12/2004 | Downs | |

OTHER PUBLICATIONS

U.S. Appl. No. 10/804,953, filed Mar. 19, 2004; "Columnar Adhesive Label Roll," P.C. Blank et al.

* cited by examiner

*Primary Examiner*—Patricia L Nordmeyer

(57) ABSTRACT

A linerless label roll includes a web wound along a running axis, and having a series of index marks spaced longitudinally apart. A series of adhesive patches runs along the web, with differently sized adhesive-free zones therebetween in register with the index marks.

27 Claims, 5 Drawing Sheets

IDLE REGISTERED LABEL ROLL

BACKGROUND OF THE INVENTION

The present invention relates generally to stationery products, and, more specifically, to adhesive labels.

The ubiquitous adhesive label is available in a myriad of configurations for use in various applications, including specialty applications. The typical adhesive label includes pressure sensitive adhesive on its back side initially laminated to an underlying release liner. The release liner is typically coated with silicone to provide a weak bond with the adhesive for permitting the individual removal of labels from the liner when desired.

Adhesive labels may be found in individual sheets, or joined together in a fan-fold stack, or in a continuous roll. Label rolls are typically used in commercial applications requiring high volume use of labels.

More specifically, in the fast food industry specialty labels may be used in identifying individual food products in typical sales transactions. The label roll may be formed of thermal paper for sequential printing of individual labels in a direct thermal printer. Or, a thermal transfer printer may also be used.

The typical pressure sensitive adhesive label includes full surface adhesive on its back side which may interfere with the handling thereof during the food preparation process. An individual label identifying the corresponding food product is removed from the printer by the user who typically wears sanitary gloves. The label may inadvertently bond to the gloves, and this increases the difficulty of placing the label on the packaging for the intended food product.

Furthermore, the liner material used in the label roll results in waste, and correspondingly affects the cost of the roll. Linerless label rolls are conventionally known in which the front surface of the label web may be coated with a suitable release material, such as silicone, for providing an integrated liner in the web itself without the need for an additional liner sheet.

When the linerless web is unwound in the printer, it extends over a corresponding feedpath having several components over which the adhesive side of the web travels. For example, each printer has a platen or drive roller for driving the web along the feedpath. One or more guide rollers are also found in the printer for guiding the web through the printer and maintaining suitable tension and alignment thereof. And, a tear or cutting bar is also typically found at the outlet end of the printer for permitting individual labels to be severed from the distal end of the web after receiving printing thereon.

Since these exemplary feedpath components are directly exposed to the adhesive on the linerless web, they can accumulate adhesive lost from the web over extended use of the printer. Adhesive buildup on these feedpath components is undesirable since it may restrain free movement of the web during operation and may lead to undesirable jamming of the web in the printer. And, the accumulating adhesive can require periodic cleaning of the feedpath components during routine maintenance operation.

Since every printer has some variation of these feedpath components, all such printers are subject to adhesive buildup when using linerless labels therein. Furthermore, the feedpath components in different printers are typically differently located along the feedpath, and adhesive buildup thereon differently affects performance of the printer.

Accordingly, it is desired to provide an improved linerless label roll for use in a printer having feedpath components exposed to the adhesive on the roll.

BRIEF SUMMARY OF THE INVENTION

A linerless label roll includes a web wound along a running axis, and having a series of index marks spaced longitudinally apart. A series of adhesive patches runs along the web, with differently sized adhesive-free zones therebetween in register with the index marks.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
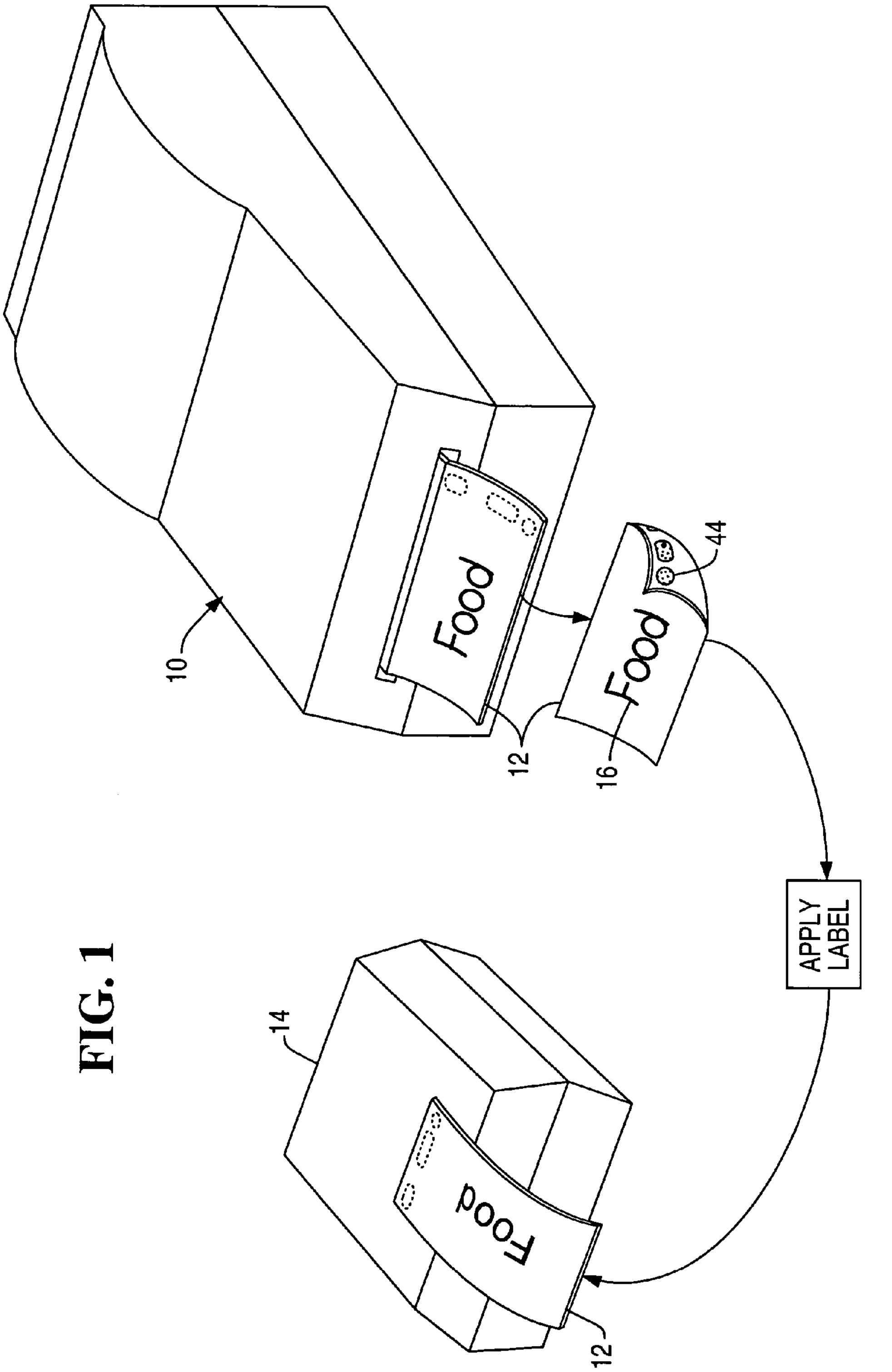
FIG. 1 is an isometric view of a thermal printer dispensing pressure sensitive labels in an exemplary application.

Illustrated in FIG. 1 is a conventional printer 10 configured for printing in sequence individual labels 12 for use in an exemplary fast food application. For example, food may be placed in a suitable food package 14 such as the paper box illustrated, or simple wrapping paper (not illustrated).

Print or identifying indicia 16 is printed on the label in the printer for identifying the contents of the package, for example. The individual printed label may then be removed from the printer and applied to the food package 14 as illustrated in the exemplary method shown in FIG. 1.

Figure 2:
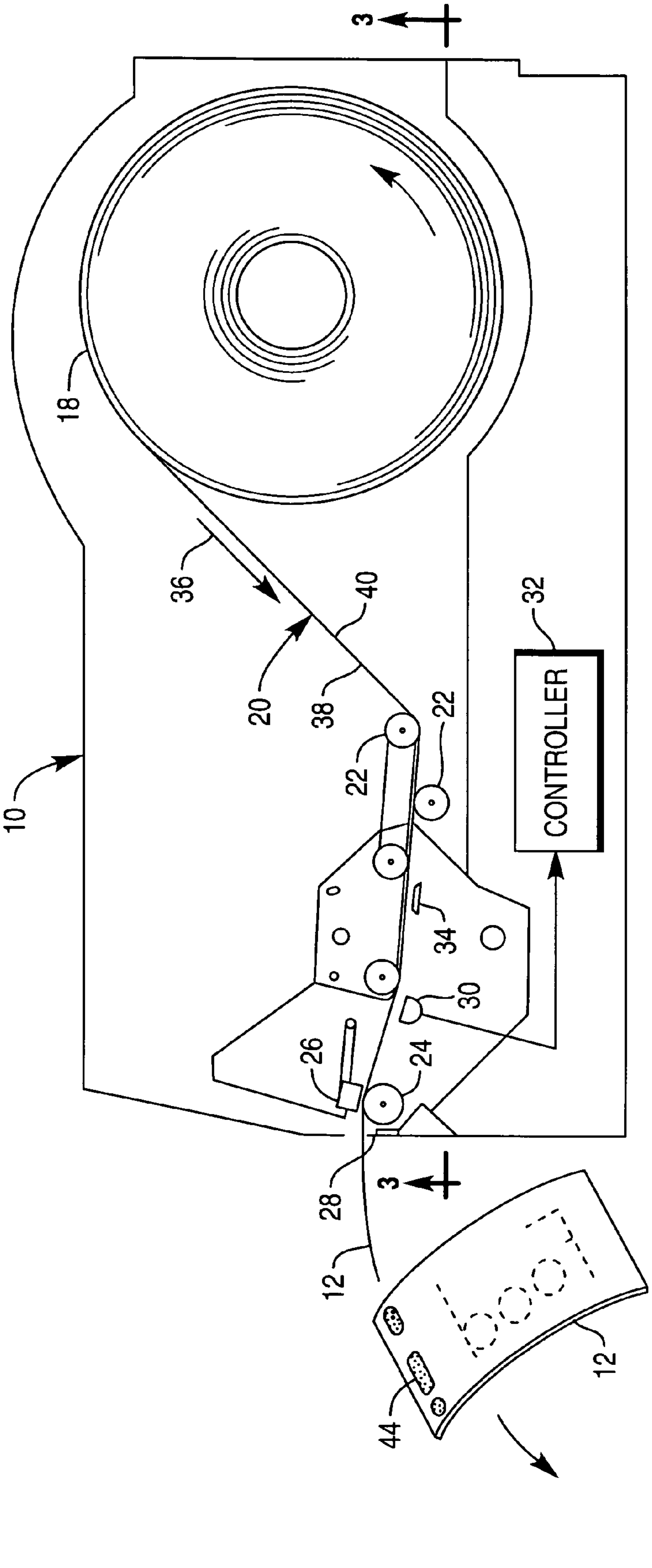
FIG. 2 is a side elevational internal view of the printer shown in FIG. 1 illustrating exemplary components along the feedpath of the label roll mounted therein.

FIG. 2 illustrates certain elements along the feedpath of the printer 10, which may otherwise have any conventional configuration, such as a direct thermal printer, or alternatively a thermal transfer printer. A label roll 18 is suitably mounted inside the printer either in a tray therefor, or on a support spindle extending through the center core thereof. The roll includes a continuous, elongate web 20 spiral wound in a multitude of overlapping layers or laminations.

Figure 3:
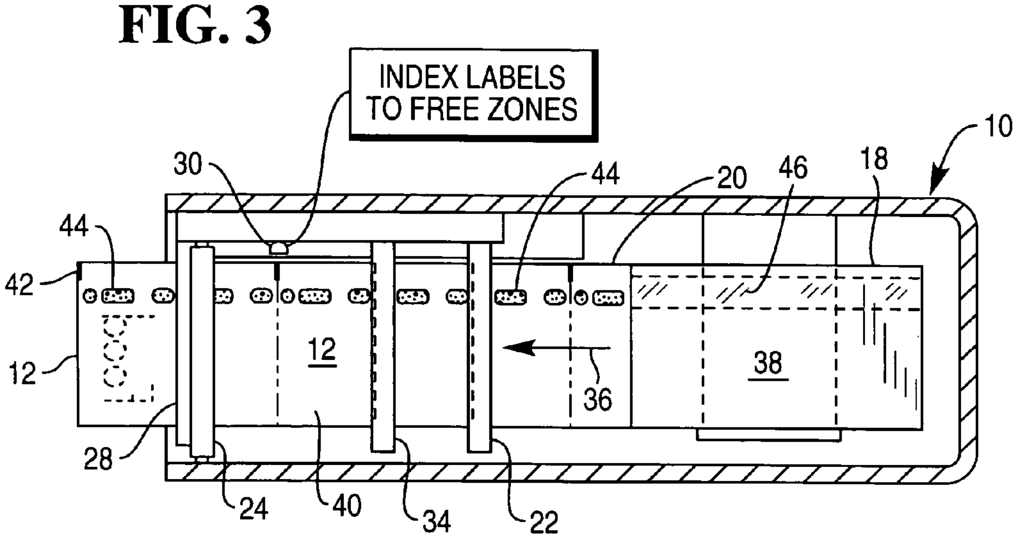
FIG. 3 is a bottom view inside the printer illustrated in FIG. 2 and taken along line 3-3.

The web 20 is dispensed from the roll inside the printer illustrated in FIGS. 2 and 3 along a suitable feedpath. The feedpath may include a series of guide rollers 22 supported on opposite sides of the web for guiding the web as it is dispensed through the printer. A platen or drive roller 24 is disposed downstream of the guides and suitably engages the web for pulling the web forward through the printer for dispensing.

Disposed above the platen roller 24 is the printing head 26 which may have any conventional configuration, such as a thermal head assembly for use in direct thermal printing of the web which may be formed of suitable thermal paper. Alternatively, a thermal transfer ribbon ((not shown) may be used with ordinary printing paper for the web.

Disposed at the outlet end of the printer is a suitable tear bar 28 suitably supported for allowing the user to simply tear or cut the dispensed label from the distal end of the web in a typical manner. Various forms of label cutting or tearing devices are conventional and may be used in the printer. For example, a rotary cutting blade may be suitably mounted for automatically cutting the presented label following printing thereof.

The exemplary printer illustrated in FIG. 2 also includes an index sensor 30 for sensing a suitable index mark contained on the web. The index sensor is operatively joined to a computer controller 32 of the printer, which in turn controls all operating functions of the printer.

Index sensors are conventional, and typically include optical components which detect a suitable mark on the web for permitting precise indexing and tearing of the individual labels 12 for the intended size. Each printed label is typically indexed with the platen roller 24 for coordinating the operation thereof.

In this way, the index mark for an upstream label on the web is detected by the sensor to coordinate rotation of the platen roller 24 to accurately dispense the downstream label 12 from the outlet end of the printer. The index marks provided on the web ensure the accurate placement of the inter-label edge of the presented label along the tear bar 28 so that a complete label can be severed from the web by the user after printing of the label.

In the exemplary embodiment illustrated in FIGS. 2 and 3, the printer also includes a snap bar 34 located on the platen side of the web which permits the optional use of the printer for direct thermal printing or thermal transfer printing with a corresponding thermal transfer ribbon (not shown).

Accordingly, the feedpath of the exemplary printer illustrated in FIGS. 2 and 3 includes a plurality of longitudinally spaced apart components 22,24,28,34 over which the web travels during operation. The web is unwound from the roll in the longitudinal direction along the running axis 36 of the web to reach the printing head 26, followed in turn by dispensing individual labels in series from the printer.

Figure 4:
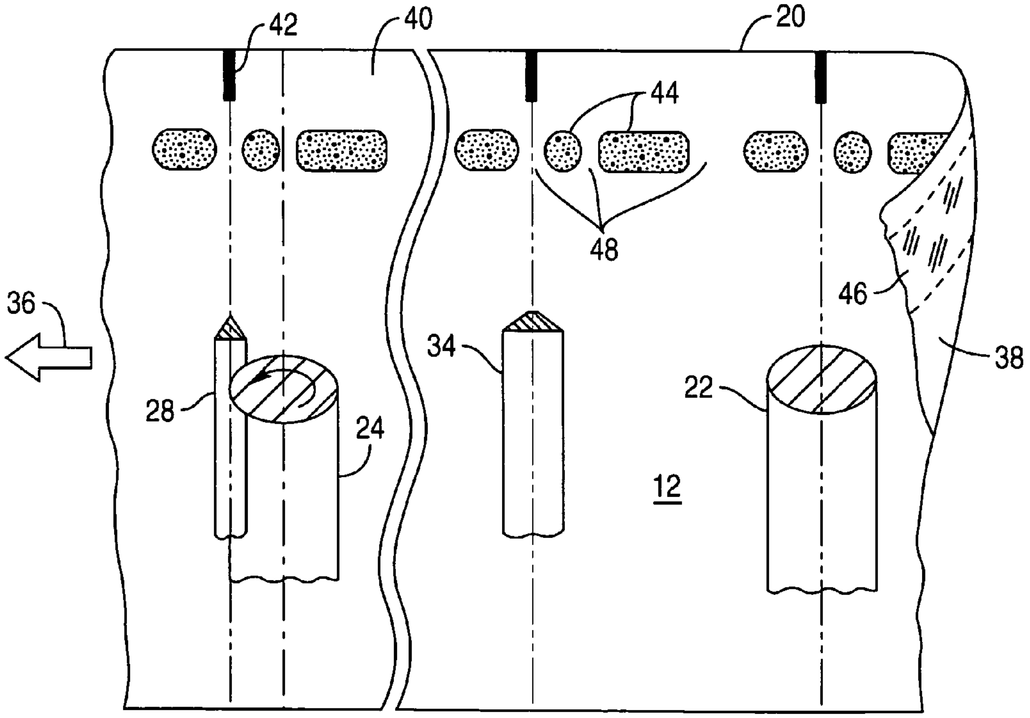
FIG. 4 is a plan view of a portion of the exemplary linerless label web illustrated in FIG. 3.

The exemplary label roll 18 is illustrated installed in the printer in FIG. 3, with an enlarged portion thereof being illustrated in FIG. 4. The web 20 is preferably a single ply sheet of suitable label material, such as thermal paper. The web includes a front or top surface 38 which is mounted in the printer illustrated in FIG. 2 facing upwardly for being printed by the printing head 26.

The web also includes an opposite back or bottom surface 40. The web is wound in the roll 18 in a spiral having a multitude of overlapping layers or laminations in which the back surface 40 is laminated against the front surface 38 of the upstream portions or inner layers of the web.

The web illustrated in FIGS. 3 and 4 includes a plurality of repeating index sensor marks 42 arranged in a series along the running axis 36 of the web and longitudinally spaced apart from each other. The index marks may have any conventional configuration such as the short black marks illustrated, and are suitably detected by the corresponding index sensor 30 in an exemplary optical form.

Any type of index mark and sensor known in the prior art may be used for indexing motion of the series of labels 12 as they are driven along the web running axis during operation. The index marks 42 are disposed on the back surface 40 of the web in the exemplary embodiment illustrated, but could also be disposed on the front surface, or may even be in the form of gaps or holes through the web detectable from either side of the web.

In the exemplary embodiment illustrated in FIGS. 3 and 4, the index marks 42 define the side or inter-label edges of the individual labels 12 and permit the individual labels to be torn accurately from the distal end of the web at the tear bar 28. The controller 32 illustrated in FIG. 2 is configured to drive the platen roller 24 to index successive labels in turn with the corresponding index mark being aligned atop the tear bar for example. An individual label may then be torn from the web for accurately controlling the size of the individual labels.

The back surface 40 illustrated in FIG. 4 includes a plurality of repeating adhesive spots or patches 44 aligned in, and spaced apart along, a column extending along the longitudinal running axis 36 of the web. The adhesive patches 44 may have any conventional composition such as the typical pressure sensitive adhesive which may be formulated for permanent bonding or temporary bonding to the intended surface, such as the package 14 illustrated in FIG. 1. In the preferred embodiment, the adhesive patches 44 effect weak bonds with the food package 14 to permit the repositioning of the individual labels without tearing of the label upon being removed from a surface.

Instead of providing full surface coverage of the adhesive on the back surface 40 illustrated in FIG. 4, the adhesive is provided solely in small patches in a relatively minor area of the back surface, with the remaining major area of the back surface being devoid of adhesive. In this way, the substantial reduction in surface area of the adhesive correspondingly decreases the buildup of adhesive inside the printer illustrated in FIG. 2 for increasing the time between any maintenance required therefor.

As further illustrated in FIG. 4, the front surface 38 of the roll includes a release strip 46 which extends along the running axis directly behind the column of adhesive patches 44. The release strip may be formed of any suitable releasing material, such as cured silicone or acrylic suitably coating or impregnating the web front surface. The release strip may extend across the full width of the web, or only a portion thereof as desired.

In this way, the column of adhesive patches 44 may be laminated to the release strip 46 in the successive layers of the roll illustrated in FIG. 4 without the need for a separate liner. The single ply web wound in the roll 18 is therefore linerless.

Accordingly, when the linerless roll is mounted in the printer illustrated in FIG. 2, the adhesive-less front surface 38 preferably faces upwardly to engage some of the guide rollers and the printing head 26 for preventing adhesive contact therewith. The adhesive back surface 40 faces downwardly and is suitably spaced from adjacent portions of the feedpath for preventing inadvertent bonding therewith.

However, some of the feedpath components will engage the web adhesive during travel. The platen roller 24, for example, is therefore preferably coated with a suitable non-stick material such as polytetrafluoroethylene, typically known by the Teflon trademark brand material to reduce adhesion with the adhesive.

The non-stick platen roller 24 will therefore suitably drive or pull the web along its feedpath in the printer to permit individual labels 12 to be cut therefrom at the tear bar 28 disposed immediately downstream from the platen roller. The exposed adhesive on the web will also travel over the lower guide roller 22 and snap bar 34.

Since the adhesive patches 44 cover a relatively small portion of the area of the back surface 40, buildup of adhesive on the various printer components is correspondingly reduced, and is limited to the small region aligned with the adhesive patches. Periodic maintenance for removing any adhesive buildup is therefore made easier, or adhesive accumulation may be insignificant within the life of the printer itself.

As shown in FIG. 4, the adhesive patches 44 are preferably aligned parallel along one lateral edge of the web 20, and closer thereto than to the opposite lateral edge of the web. In this way, the adhesive is isolated along only one edge of the web, with the remainder of the back surface 40 being devoid of the adhesive.

A particular advantage of the this columnar adhesive configuration is that most of the individual label 12 as illustrated in FIG. 1 is without adhesive and permits ready handling thereof, even by users wearing gloves, with little chance of grabbing the adhesive patch itself. The isolated adhesive patch may then be used for bonding the entire label to the package 14, in a cantilever fashion for example, for permitting grasping thereof for removal and repositioning of the label if desired.

As shown in FIG. 4, the longitudinal series of index marks 42 are in turn used to define the longitudinal series of individual labels 12 being configured along the running axis of the web 20. As indicated above, a majority of the back surface of each label 12 is preferably devoid of adhesive, with the adhesive running along one edge of the label in the series of adhesive patches 44.

Correspondingly, the individual adhesive patches 44 in the common column are longitudinally separated from each other by corresponding adhesive-free zones 48. The longitudinal spacing between the adhesive patches which defines the longitudinal length of the corresponding free zones 48 is preferably different in each of the labels relative to or in register with the corresponding index marks 42 which are used to define the individual labels.

In the exemplary embodiment illustrated in FIG. 4, the adhesive patches 44 also have different sizes or longitudinal lengths along the running axis 36 of the web relative to or in register with the corresponding index marks 42. In this way, both the adhesive patches and the intervening adhesive free zones may be predeterminedly located on the individual labels to correspond with their subsequent travel inside the printer illustrated in FIGS. 2 and 3.

More specifically, and as indicated above, the exemplary printer feedpath illustrated in FIGS. 2 and 3 includes several longitudinally spaced apart components, such as 22,24,28 and 34 over which the web back surface 40 travels or touches during operation. The adhesive-free front side or surface 38 of the web faces upwardly towards the printing head 26 and is retained by various top guides in the printer, whereas the back side or surface 40 of the web faces downwardly and engages the additional feedpath components therebelow as the web travels downstream through the printer and is dispensed from the initial roll 18.

During dispensing operation, the small patches of adhesive will slide past the feedpath components in engagement therewith and are subject to relatively small adhesive buildup over the life of the printer.

However, when the printer is idle temporarily between printing individual labels, or for longer periods of inactivity, it is undesirable to have the adhesive patches remain in contact with any of the feedpath components for any extended period of time during which the adhesive bond therewith might be allowed to strengthen and result in additional buildup of adhesive on the feedpath components. This adhesive contact may also lead to printer jams.

Accordingly, the adhesive-free zones 48 illustrated in FIG. 4 are predeterminedly located on the web 20 to correspond in longitudinal spacing with the longitudinal spacing of the various feedpath components, such as the guide roller 22, platen roller 24, tear bar 28, and snap bar 34, so that during idle use of the printer, the free zones are temporarily aligned with these components and prevent adhesive contact therewith. Correspondingly, the series of adhesive patches 44 are distributed between the various feedpath components during idle operation and are suspended remotely therefrom without contact therewith.

Accordingly, in a method of operating the printer illustrated in FIGS. 1 and 2, the label roll is initially installed in the printer, with the web 20 being fed along the longitudinal feedpath defined by the various feedpath components. Individual labels 12 as illustrated in FIG. 1 may be printed in series along the web and dispensed from the printer one by one in turn for their intended use.

As shown in FIGS. 3 and 4, the index sensor 30 is used for detecting the series of index marks 42 in turn as the web is driven through the printer. The controller 32 is then operated to ensure that successive label edges defined by the corresponding index marks are accurately positioned along the tear bar 28 for each label in turn.

Correspondingly, the adhesive free zones 48 on the web are also positioned in alignment or register with the corresponding feedpath components during idling operation and therefore prevent resting of the adhesive patches on the feedpath components.

FIGS. 3 and 4 illustrate that when the dispensed label 12 is located with its trailing edge index mark 42 aligned atop the tear bar 28, corresponding upstream free zones 48 are aligned with the guide roller 22, platen roller 24, and snap bar 34. In this idle position of the web between successive printing of the adjacent labels, the corresponding free zones 48 are specifically positioned to correspond with any and preferably all feedpath components which might otherwise be in contact with the adhesive patches.

Accordingly, each label roll 18 is custom designed for a specific label printer and the specific location of the various feedpath components therein over which the adhesive travels during operation. By preferentially locating the adhesive free zones 48 in each embodiment of the label for a corresponding printer design, adhesive-free contact between the linerless label and the feedpath components may be obtained during idle operation of the printer, and thereby further reduce the opportunity for adhesive buildup during the life of the printer and for printer jams.

In the exemplary embodiment illustrated in FIG. 4, the adhesive free zones 48 are sized and located along the column of adhesive patches to match the corresponding longitudinal spacing of the various feedpath components found in the associated printer over which the adhesive will travel during operation. The size or length of the free zones 48 are selected within suitable manufacturing and operational tolerances to prevent contact of the adjacent adhesive with the feedpath components during idle operation.

Correspondingly, the series of adhesive patches 44 in each label 12 have different lengths to maximize the collective surface area of the adhesive patches in each of the labels, which adhesive is interrupted by the adhesive-free zones therebetween.

The exemplary forms of the adhesive patches 44 illustrated in FIG. 4 have different sizes or surface area in each of the labels, and also have different configurations as defined by their size, area, width, or profile.

The adhesive patches 44 preferably vary in lateral width between the leading and trailing edges thereof, and along the running axis 36 of the web. For example, each patch 44 preferably diverges in width aft from the leading edge thereof along the running axis, and also converges in width aft to the trailing edge along the running axis.

The leading and trailing edges of the adhesive patches 44 illustrated in FIG. 4 are preferably arcuate and generally nonlinear for both performance and manufacturing advantages. For example, each of the labels 12 includes a corresponding circular adhesive patch followed in turn by two oblong patches of different lengths. The circular patches have convex leading and trailing edges. The oblong patches may have convex leading and trailing edges, or convex edges with short straight sections therebetween.

The circular and oblong patches 44 illustrated in FIG. 4 alternate along the running axis in the series of labels 12 and repeat in pattern identically from label to label. In this way, the amount of adhesive in the limited column provided for the adhesive patches may be maximized along the running axis of the web, while minimizing the longitudinal length of the adhesive free zones 48 therebetween. The free zones may be used to advantage as discussed above to ensure alignment thereof with corresponding feedpath components found in the intended printer over which the adhesive patches travel during dispensing of the labels, with the free zones being aligned therewith during idle operation.

The platen roller 24 illustrated in FIG. 4 is driven during operation to pull the web through the printer for dispensing labels in turn. The column of adhesive patches 44 therefore not only travels transversely over the platen roller 24 but also over the other feedpath components such as the guide roller 22, tear bar 28, and snap bar 34.

The varying width of the leading and trailing edges of the adhesive patches therefore gradually transitions the adhesive patches with these feedpath components as the leading edges are carried thereover, and correspondingly gradually transitions the trailing edges of the patches as they leave these components during travel. This feature may be used to advantage for decreasing adhesive buildup during operation of the printer over its intended life.

Figure 5:
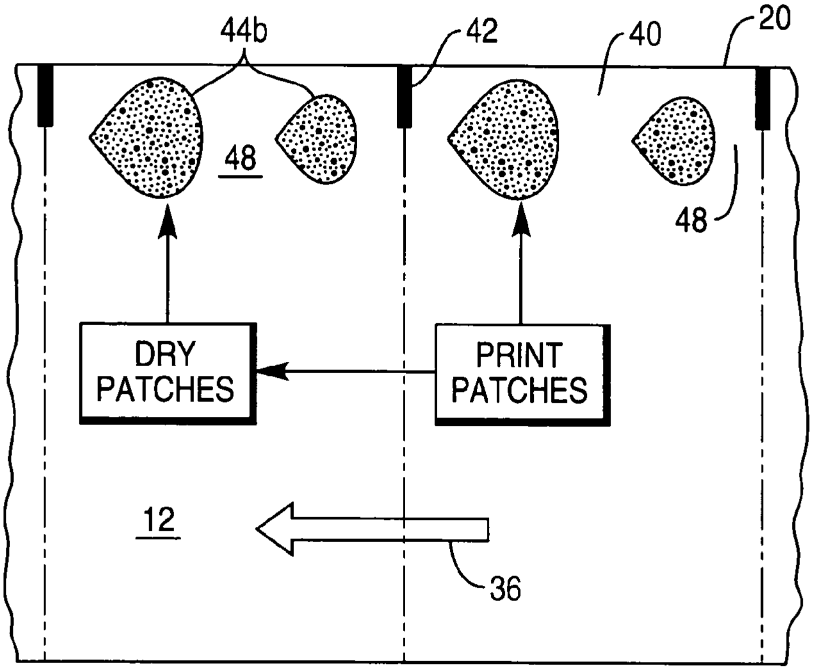
FIG. 5 is a plan view of a portion of the linerless web in accordance with another embodiment.

FIG. 5 illustrates another embodiment of the linerless web 20 in which the adhesive patches, designated 44*b*, have a different, ovate configuration in the general form of a teardrop. The ovate patches 44*b* have narrow or relatively sharp leading edges and spread in width, which becomes maximum before converging to the trailing edges thereof. Since the leading and trailing edges vary in width along the running axis, the ovate adhesive patches enjoy the operational advantages described above.

In addition, the ovate patches enjoy advantages during manufacture. FIG. 5 illustrates schematically that the series of ovate patches may be formed during manufacturing by printing the desired adhesive patches on the web in a column along one edge thereof. The running axis 36 illustrated in FIG. 5 is also the running axis of the web during the printing operation which permits the individual patches to be suitably cured or dried as each patch is printed at an upstream location.

Testing of this design has shown that the thickness of the applied adhesive may be made more uniform due to the varying width of the patch, and this prevents excessive buildup or thickness of the adhesive near the trailing edge of the patches. Excessive adhesive buildup is undesirable because it increases the time required for drying the adhesive, and excessive adhesive may not fully dry during the manufacturing process and can later lead to liberation of the excessive adhesive inside the printer leading to undesirable adhesive buildup in the various components thereof.

Correspondingly, the varying width configuration of the adhesive patches illustrated in FIG. 5 therefore permits a wider range of process speeds with improved adhesive drying capability resulting in a final product with a more consistent adhesive coating weight. In view of the improved uniformity of the adhesive patch, additional adhesive coat weight or thickness may be obtained without unacceptably long drying times, or subsequent adhesive shedding in the printer.

In the exemplary embodiment illustrated in FIG. 5, the ovate patches 44*b* may alternate in large and small size along the running axis 36 which can be used for tailoring the adhesive performance thereof while also tailoring the length of the intervening adhesive-free zones 48 therebetween. Although two ovate patches 44*b* are illustrated in FIG. 5, three or more of such patches may be used in manner similar to the embodiment illustrated in FIG. 4.

As indicated above, the number, size, and spacing of the adhesive patches and the corresponding adhesive-free zones 48 therebetween are controlled in large part by the configuration of the intended printer and the size and location of the corresponding feedpath components therein. Each printer typically has some form of platen roller, some form of tear bar or cutter, and some form of guide roller subject to adhesive buildup from the linerless label roll. The number of adhesive patches and intervening adhesive-free zones is therefore tailored to the specific embodiment of the intended printer.

Figure 6:
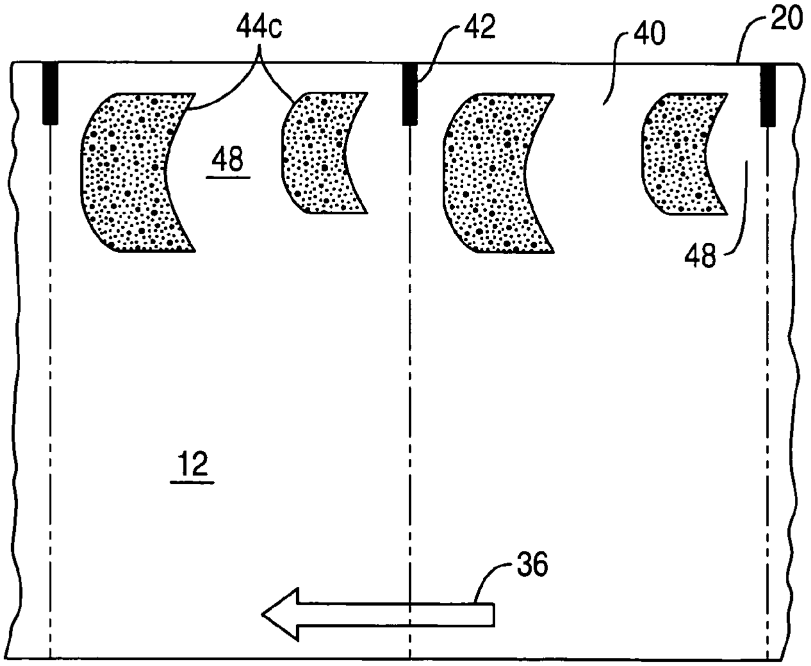
FIG. 6 is a plan view of a portion of the linerless web in accordance with another embodiment.

FIG. 6 illustrates yet another embodiment of the adhesive patches in the form of chevron patches designated 44*c*, which alternate in large and small sizes along the running axis 36 in the exemplary embodiment illustrated.

The chevron patches 44*c* have arcuate or nonlinear leading and trailing edges, with the leading edge thereof having a relatively wide convex contour, and the trailing edges thereof having similarly wide concave profiles. Testing of the chevron patch design supports the additional manufacturing and performance benefits described above for the previous embodiments.

Figure 7:
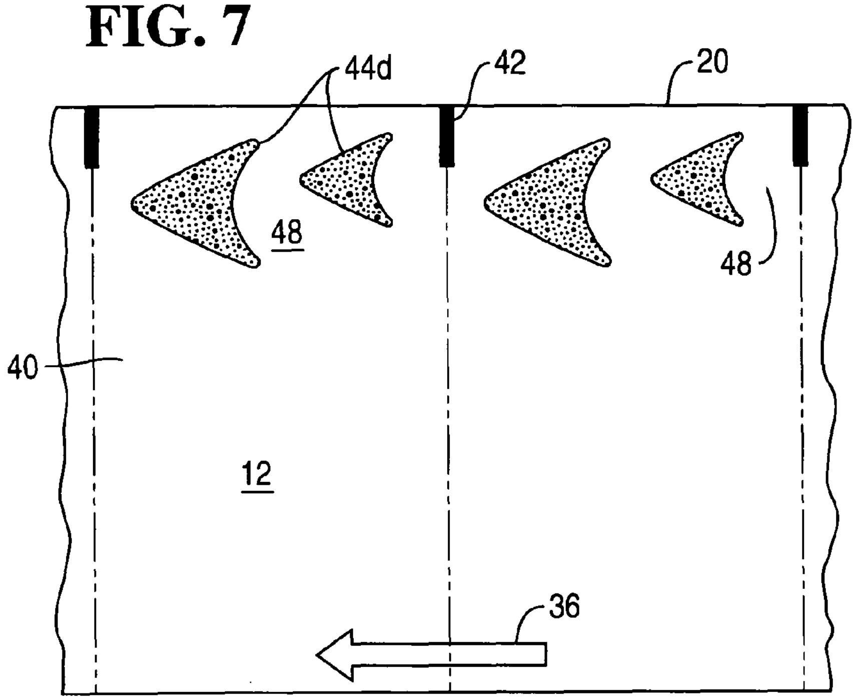
FIG. 7 is a plan view of a portion of the linerless web in accordance with another embodiment.

FIG. 7 illustrates yet another embodiment of the adhesive patches in the exemplary form of arrowhead patches 44*d*. The arrowhead patches similarly alternate in large and small size along the running axis 36 in the same manner as the above embodiments.

The arrowhead patches 44*d* have relatively narrow or sharp leading edges and spread in width to relatively wide concave trailing edges terminating in two points. Testing of this design also confirms the advantages in performance and manufacture as described above.

The various forms of adhesive patches described above may be aligned along only one edge of the corresponding webs 20 closer thereto than to the opposite edge of the web. The collective surface area of the column of adhesive patches in these various embodiments correspond with a minor area of the full back surface of each label, with a major area of the back surface being devoid of adhesive.

Figure 8:
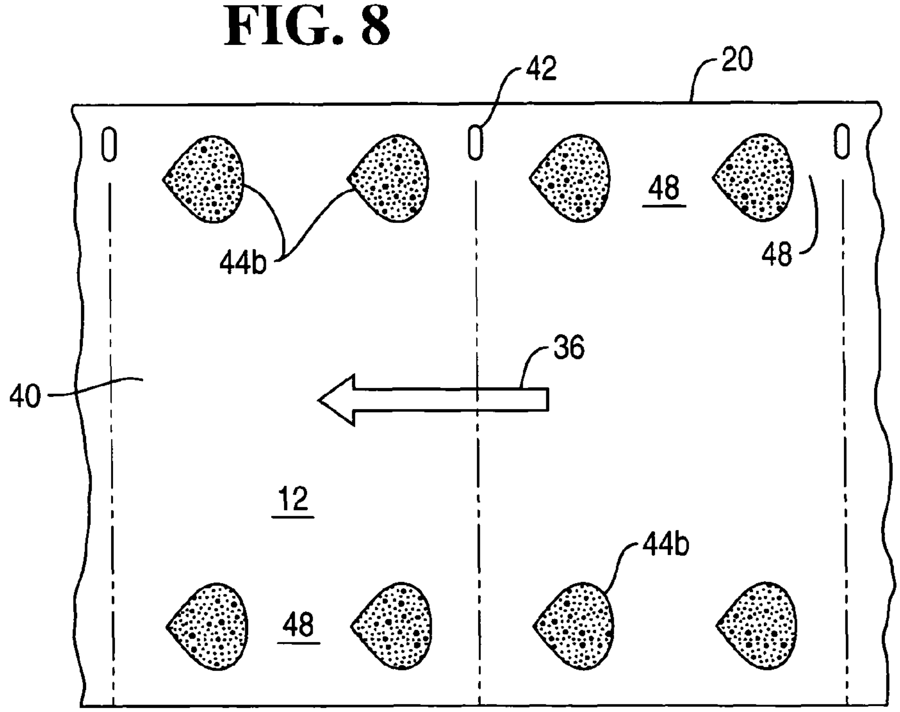
FIG. 8 is a plan view of a portion of the linerless web in accordance with another embodiment.

FIG. 8 illustrates yet another embodiment in which the ovate adhesive patches 44*b*, for example, are disposed in two columns along opposite edges of the same web 20. The use of columns of the adhesive patches reduces the likelihood of adhesive buildup over the life of the printer, and although one column of adhesive patches is preferred, two or more columns may be used if desired.

FIG. 8 also illustrates an alternate form of the index mark 42 which may be a simple aperture or gap through the web optically detected in any conventional manner. As indicated above, various forms of index marks may be used for optical or magnetic, or in any other conventional form of detection.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A label roll comprising:

a web wound in said roll along a running axis, and an identically repeating series of differently sized adhesive patches and differently sized adhesive free zones therebetween aligned in a column along said web.

2. A roll according to claim 1 wherein said adhesive patches vary in width between leading and trailing edges thereof along said running axis.

3. A roll according to claim 2 wherein said leading and trailing edges of said adhesive patches are arcuate.

4. A roll according to claim 1 wherein said web further comprises a series of index marks spaced apart longitudinally therealong.

5. A roll according to claim 4 wherein:

said web includes one side containing said adhesive patches and free zones, and an opposite side containing a release strip aligned therewith to form a series of linerless labels defined between said index marks; and said free zones are predeterminedly located on said web in each of said labels in register with said index marks.

6. A label roll for use in a printer comprising:

a web having a front surface and an opposite back surface wound in a roll, and including a plurality of index marks spaced apart longitudinally along a running axis of said web to define a series of labels;

said back surface including an identically repeating series of adhesive patches aligned in a column along said running axis and separated from each other by adhesive free zones having different lengths in each of said labels in register with said index marks to prevent adhesive contact during idle interruption in travel of said web through said printer, wherein said adhesive patches have different lengths along said running axis in register with said index marks; and said front surface including a release strip extending along said running axis behind said column of adhesive patches, and laminated to said patches in successive layers in said roll.

7. A roll according to claim 6 wherein:

said printer includes a feedpath with a plurality of longitudinally spaced apart components over which said web back surface travels during operation; and said free zones are predeterminedly located on said web to correspond in longitudinal spacing with said longitudinal spacing of said feedpath components.

8. A method of using said label roll according to claim 7 comprising:

installing said roll in said printer, with said web being fed along said feedpath;

printing individual labels in series along said web; and detecting said index marks and indexing said web to position said adhesive free zones in register with said feedpath components during idling between printing said labels.

9. A roll according to claim 6 wherein said adhesive patches have different lengths in each of said labels.

10. A roll according to claim 6 wherein said adhesive patches have different sizes in each of said labels.

11. A roll according to claim 6 wherein said adhesive patches have different configurations in each of said labels.

12. A roll according to claim 6 wherein each of said adhesive patches diverges aft from a leading edge thereof along said running axis.

13. A roll according to claim 12 wherein each of said adhesive patches converges aft to a trailing edge thereof along said running axis.

14. A roll according to claim 13 wherein said adhesive patches comprise circular patches.

15. A roll according to claim 13 wherein said adhesive patches comprise oblong patches.

16. A roll according to claim 13 wherein said adhesive patches comprise alternating circular and oblong patches.

17. A roll according to claim 13 wherein said adhesive patches comprise ovate patches.

18. A roll according to claim 17 wherein said ovate patches alternate in large and small size along said running axis.

19. A roll according to claim 17 wherein said ovate patches have narrow leading edges and spread in width toward the trailing edges thereof.

20. A roll according to claim 13 wherein said adhesive patches comprise chevron patches.

21. A roll according to claim 20 wherein said chevron patches have wide convex leading edges, and concave trailing edges.

22. A roll according to claim 20 wherein said chevron patches alternate in large and small size along said running axis.

23. A roll according to claim 13 wherein said adhesive patches are shaped like arrowheads.

24. A roll according to claim 23 wherein said arrowhead patches have narrow leading edges and spread in width to concave trailing edges.

25. A roll according to claim 23 wherein said arrowhead patches alternate in large and small size along said running axis.

26. A roll according to claim 1 wherein said patches are aligned along one edge of said web in a minor area of said back surface, with a major area of said back surface being devoid of adhesive.

27. A roll according to claim 26 wherein said adhesive patches are disposed in two columns along opposite edges of said web.

* * * * *